Nov. 3, 1953   O. J. POUPITCH   2,657,402
SCREW SHANK SLOTTER
Filed Nov. 5, 1948   3 Sheets-Sheet 1
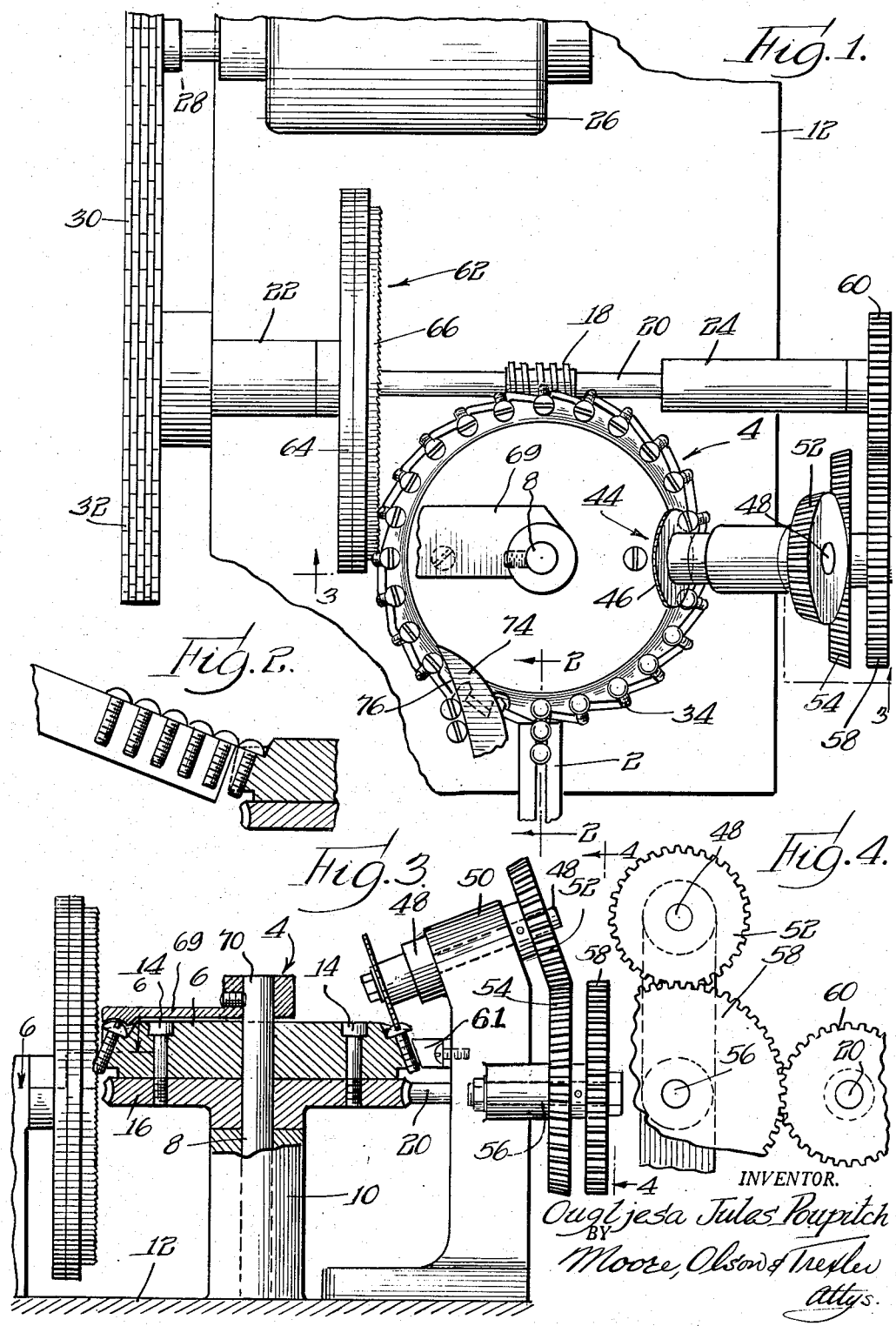

Nov. 3, 1953   O. J. POUPITCH   2,657,402
SCREW SHANK SLOTTER
Filed Nov. 5, 1948   3 Sheets-Sheet 2
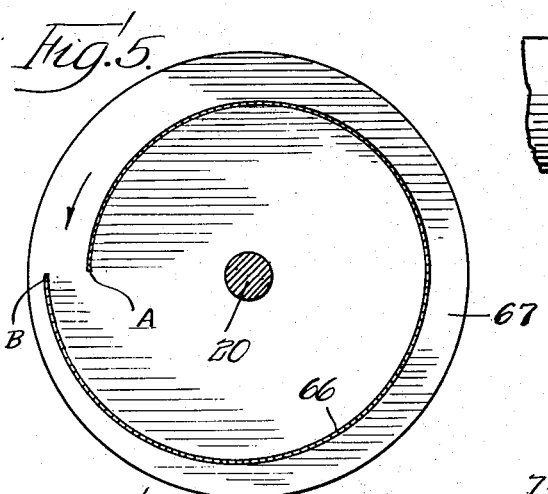
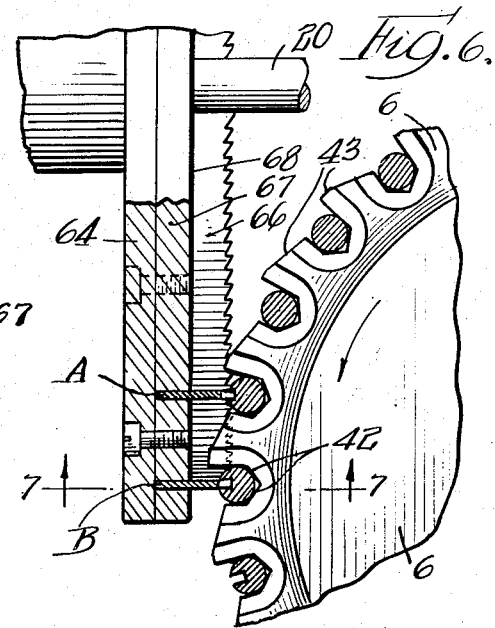
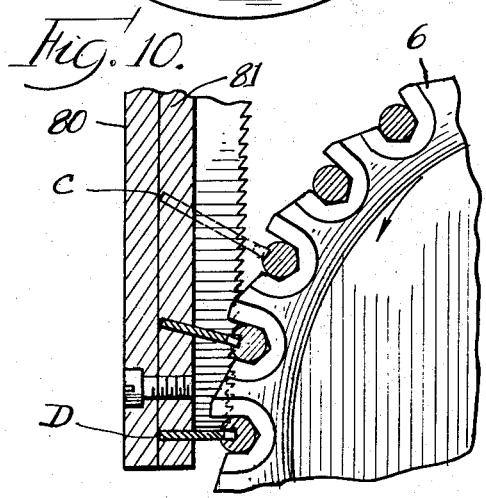
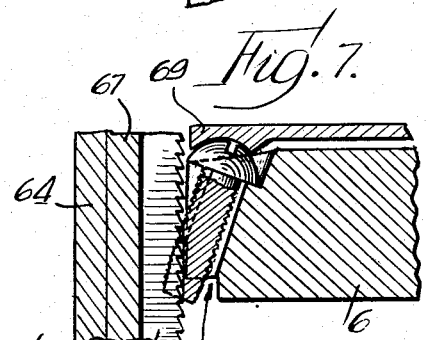
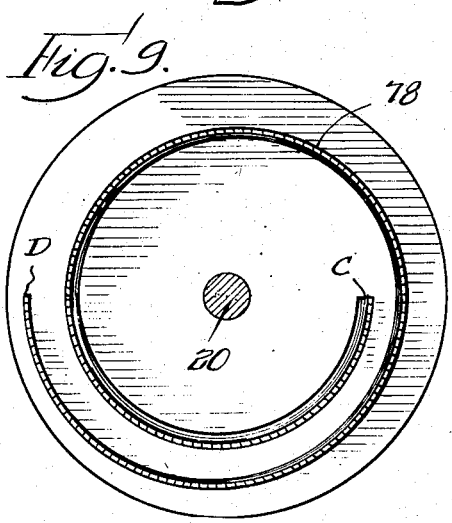
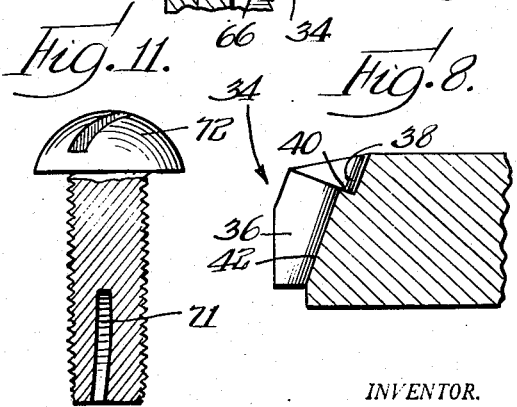
INVENTOR.
Ougljesa Jules Poupitch
BY
Moore, Olson & Trexler
attys.

Nov. 3, 1953  O. J. POUPITCH  2,657,402
SCREW SHANK SLOTTER
Filed Nov. 5, 1948  3 Sheets-Sheet 3
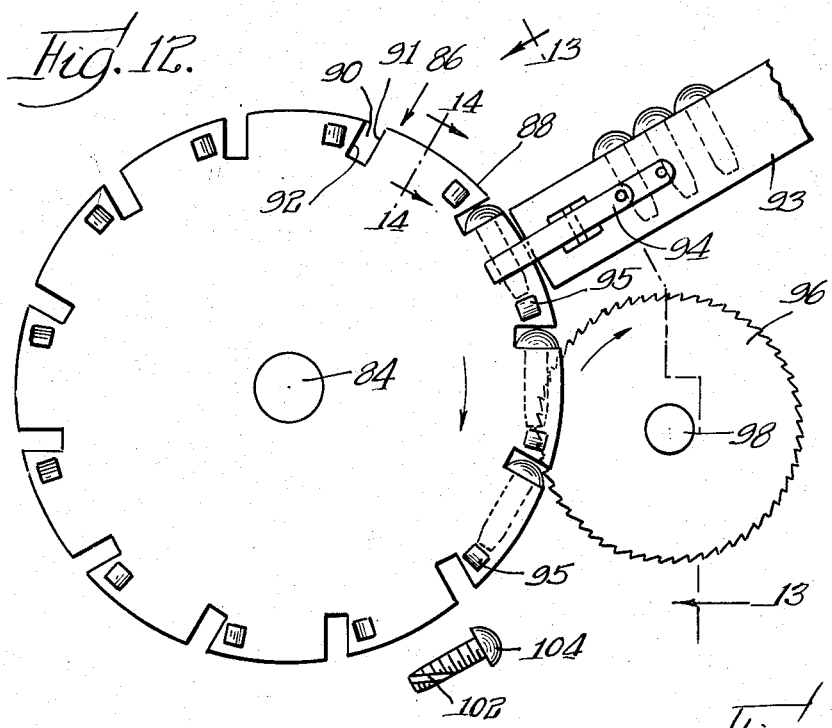
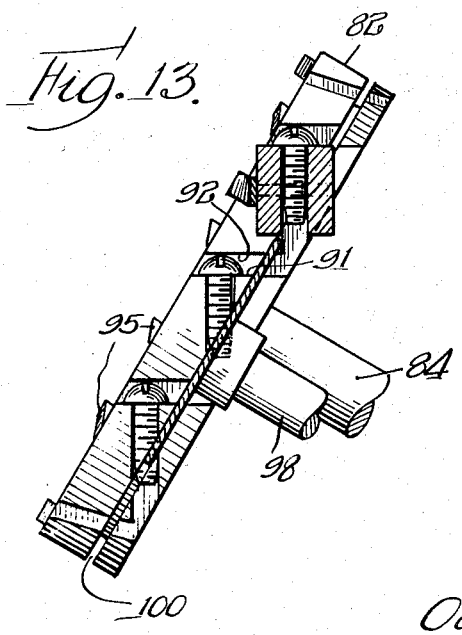
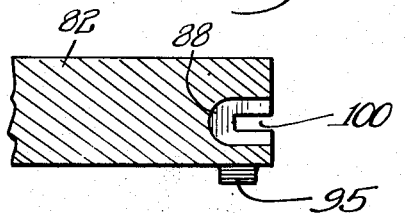
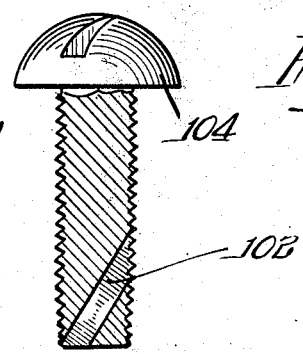
INVENTOR.
Ougljesa Jules Poupitch
BY
Moore Olson & Trexler
attys.

Patented Nov. 3, 1953

2,657,402

UNITED STATES PATENT OFFICE 2,657,402

SCREW SHANK SLOTTER

Ougljesa Jules Poupitch, Chicago, Ill., assignor to Illinois Tool Works, Chicago, Ill., a corporation of Illinois Application November 5, 1948, Serial No. 58,393

11 Claims. (Cl. 10—2)

1

This invention relates to an article working machine or mechanism, and more particularly to a mechanism for slotting the shanks of screws in the manufacture of self-tapping screws.

A principal object of the invention is to provide a screw slotting machine in which the screws are fed continuously from a delivery point to a discharge point, and the screws slotted while they are continuously moving between said points.

A further object of the invention is to provide a combined head and shank screw slotter mechanism.

A more particular object of the invention is to provide in a screw shank slotter a continuously rotating screw carrier for feeding screws at a uniform rate to a saw in continuous engagement with a screw during a predetermined portion of the advance of the screw at said uniform rate whereby to slot the shank of the screw without interfering with its continuous movement at said rate.

Heretofore screw slotting machines, whether for slotting the shanks of thread cutting screws or for slotting the heads of screws, have usually employed an intermittently rotated or reciprocated carrier advancing the screws successively into a position in the path of a saw for holding each screw stationary in such position during the transverse movement of the saw. Such machines, although the parts thereof are operated at very high speeds, are quite limited in the number of screws per minute which can be slotted. The present invention contemplates the provision of a screw slotting machine in which, although the screw carrier and the saw are operated at a relatively low speed, thereby increasing the life of the saw and decreasing the machine maintenance requirements, the capacity of the machine in the number of screws slotted per minute is greatly multiplied.

Other and more general objects of the invention are to provide a screw slotting machine composed of a minimum of parts; to provide a screw slotting machine in which the slotting saw is so arranged relative to the screws in the screw carrier during the slotting operation that a simple, stationary shank guard prevents the screws from moving out of, or relative to the carrier, during the head slotting operation, and to provide a screw slotting machine in which the screws may be fed by a simple, inexpensive, continuously rotating turret, and the screws slotted by a saw having a spiral blade continuously rotated so that the saw blade rolls into engagement with the shank of each screw and simultaneously moves both longitudinally of the screw and arcuately of the turret with the screw so as to slot the shank of the screw while it is being continuously advanced by the turret.

Other and further objects and advantages of the invention will be apparent from the following description when taken in connection with the accompanying drawings, wherein:

Figure 1 is a fragmentary, top plan view of a screw slotting machine embodying the present invention;

Figure 2 is a fragmentary view in vertical section taken substantially along the line 2—2 of Figure 1;

Figure 3 is a fragmentary view in vertical section taken substantially along the line 3—3 of Figure 1;

Figure 4 is a fragmentary view in elevation looking along the line 4—4 of Figure 3;

Figure 5 is a view in elevation of the slotting saw forming part of the machine of Figures 1 to 4;

Figure 6 is an enlarged fragmentary view in horizontal section taken substantially along the line 6—6 of Figure 3;

Figure 7 is a view in vertical section taken substantially along the line 7—7 of Figure 6;

Figure 8 is a view in radial section through the screw feeding turret of the machine of Figures 1 to 7;

Figure 9 is a view similar to Figure 5 but showing a modified form of slotting saw;

Figure 10 is a view similar to Figure 6 showing the operation of the saw of Figure 9;

Figure 11 is a view in elevation of a self-tapping screw slotted by the machines of Figures 1 to 10;

Figure 12 is a somewhat diagrammatic view in elevation of a modified form of screw slotter;

Figure 13 is a fragmentary view in vertical section taken substantially along the line 13—13 of Figure 12;

Figure 14 is a fragmentary view in horizontal section taken along the line 14—14 of Figure 12; and Figure 15 is a view in elevation of a self-tapping screw slotted by the slotter of Figures 12 to 14.

As shown in the drawings, a machine embodying the present invention may comprise screw feeding means of any desired type including an inclined screw feeding chute 2 formed by spaced bars receiving between them the shanks of the screw elements or blanks and supporting the heads of the screws.

A continuously moving screw carrier 4 preferably comprises, as shown in Figures 1 to 4, 6, 8 and 10, a rotatable disk 6 secured to a shaft 8 journalled in a suitable bracket 10 upstanding from or secured to the bed plate 12. The disk 6 is secured as by bolts 14, Figure 3, to a worm wheel 16 driven by a worm 18 on a horizontal shaft 20. Shaft 20 is journalled in suitable brackets 22 and 24 secured to the bed plate, the shaft 20 being driven by an electric motor 26 through a sprocket 28 on the motor shaft, a sprocket chain 30 and a sprocket 32 on the shaft 20.

The disk 6 is formed with a radially tapered peripheral portion having a plurality of equally spaced, outwardly, or peripherally, opening screw receiving recesses 34. Each recess 34, as best seen in Figures 3, 6 and 8, has a lower shank receiving portion 36 and an upper head receiving portion 38, the shank receiving portion 36 being inclined or diverging downwardly from the axis of rotation of the disk and the head receiving portion 38 being countersunk below the tapered upper surface of the disk and having a head positioning or seating surface 40 normal to the inclined axis of the shank receiving section 36 of the screw receiving recess. The inner wall surface 42 of the shank receiving section 36 of each screw receiving recess is substantially V-shaped in section as illustrated in Figure 6, so as to centralize the shank of each screw in a radial plane through the axis of rotation of the disk and permit ready turning of the screw within the recess. The inner wall surfaces 42 are inclined in a vertical direction and the extensions of these wall surfaces intersect at a common point which lies on an extension of the axis of rotation of the disk so that these inner wall surfaces form in effect, in the vertical direction, a screw positioning conical surface rotating about its own axis. The vertical, peripheral edge of the disk 6 is relieved or cut away on the forward side of each recess 34, as indicated at 43 in Figure 6, to facilitate the movements of the screws from the chute 2 into the recesses.

As the carrier or disk 6 revolves the screws gravitate in succession from the lower end of the chute 2 into the recesses 34 and are so seated therein that the screws are supported with their heads in the head receiving portions 38 of the recesses and with their shanks in the shank receiving portions 36 and are so inclined that the lower ends of the shanks lie at the greatest radial distance from the axis of rotation of the disk. As the carrier continues to revolve, the screws are first carried to a head slotter 44 which preferably comprises a circular saw blade 46 secured to the outer end of an inclined shaft 48 journalled in a bracket 50 extending from the bed plate 12. The shaft 48 is mounted in such inclined position that the axis of rotation of the saw is substantially perpendicular to the axes of the screws at the head slotting station, and the saw rotates in an inclined plane coincident with the axis of the screw at the head slotting station. The shaft 48 extends beyond the bracket 50 and has secured to it a driving bevel gear 52 meshing with a like bevel gear 54 secured to a shaft journalled in a boss 56 extending laterally from the bracket 50. A gear 58 on the same shaft as the gear 54 meshes with a drive gear 60 secured to the outer end of the shaft 20. A guard block 61, having an arcuate edge extending partially about and in close proximity to the wheel 6, prevents the screws from jumping out the recesses 34 during the head slotting operation. As the carrier brings the screws into engagement with the rotating head slotting saw the saw engages the screws and the guard holes them on the carrier disk. The slot is cut diametrically of the head of each screw, each screw turning relative to its recess during this head slotting operation to accommodate the arcuate revolution of the carrier disk during the slotting operation. The shape of each screw slot is such, as previously described, that such turning of each screw about its axis is readily permitted.

The continued revolution of the carrier disk carries the head slotted screws from the slotting unit 44 to a shank slotting mechanism or saw 62. This unit comprises a disk 64 secured to the shaft 20 for rotation therewith and a saw blade 66 in the form of an Archimedean spiral, the saw blade being set into an Archimedean spiral groove or slot in a disk 67 bolted to the disk 64, the saw being fastened to the disk 67 in any suitable manner as by soldering, by radial pins, or otherwise, as may be most convenient. It should be noted that in the form shown in Figure 5 the saw blade has been formed of a spiral of one revolution or 360 degrees, beginning at the leading end or point A and terminating at the trailing end or point B, the points A and B lying on the same radius and the distance between them constituting the lead or pitch of the spiral. It should be noted that the plane of the blade is normal to the face 68 of the disk 67 as shown in Figure 6.

The shaft 20 is so spaced from the shaft 8 that a plane passing through the axis of shaft 8 normal to the face 68 of the disk 64 intersects the spiral saw blade at the point B, as best shown in Figures 1 and 6. The speed of rotation of the screw carrying disk or turret is made such that the screws in the carrier are revolved at an angular velocity equal to the lead of the spiral saw blade. In other words, the screws are moved at a uniform rate such that each screw moves through an arc corresponding to the distance A—B during each revolution of the saw blade about the shaft 20.

A segmental guard or hold down 69 is secured to the upper end of the stationary shaft 70 and overlies the heads of the screws in engagement with the blade 66.

As the disk 6 revolves carrying a screw from point A to point B in Figure 6 the screw element approaches the plane of the saw carrying disk and the saw blade therefore advances or penetrates more deeply into the screw so that the screw carrier disk provides an automatic feed regulating the progressive proper cutting of the screw to the proper depth.

Since the saw blade is normal to face 68, and radial of the turret only at the point B, each screw may turn slightly within its recess during the slotting operation.

Since the shank of the screw blank extends at an angle to the plane through the forward edges of the saw teeth (as shown in Figure 7), the slot formed in the shank of the screw blank is of increasing depth from the midpoint to the lower or bottom end of the shank. Since the saw blade is spiral in form, the slot 71 produced in the self-tapping screw 72, Figure 11, is of like form longitudinally of the screw shank, and it should be noted that this spiral slot 71 is a "right hand" spiral which has been found to provide a very efficient thread forming cutting edge.

After the slot 71 has been cut, the continued rotation of the screw carrier disk 6 carries each slotted screw from the trailing edge B of the saw blade to a deflecting and ejecting finger 74, Figure 1, mounted on a suitable bracket (not shown) and projecting over the rim of the disk 6 with its front or camming edge surface 76 in position to engage the head of each screw as the disk revolves and guide each screw out of the recess 34 thereby to eject it from the carrier disk.

It will be understood that screws may be threaded by rolling or otherwise, either prior or subsequent to the slotting. It is preferable, however, to head the screw blanks and then roll the thread thereon before slotting the heads and shanks by the machine of Figures 1 to 8.

In Figures 9 and 10 a modified form of shank slotting unit is shown, comprising a saw blade in the form of an Archimedean spiral of more than one revolution, i. e., one and one-half revolutions or 540 degrees. The saw blade 78 is mounted in its carrying disks 80 and 81 in a manner similar to the mounting of saw blade 66 in its carring disk 64. The lead or pitch of the spiral saw blade 78 is substantially the same as the lead or pitch of the spiral saw blade 66 but the blade 78 will engage each screw, during its revolution with the carrier disk 6, through an angle substantially twice that of the angle of engagement of the saw blade 66 with the screw, as shown by comparison of Figures 6 and 10.

The saw blade 78 is inclined at a progressively decreasing angle from the entering end C to the trailing end D so as to always extend radially of the turret and is preferably also tapered longitudinally, being of greater depth or width at the entering end C and tapering to a minimum depth or width at the trailing end D so that the blade in effect reaches out and into the path of the screw blank, as shown in Figure 10. Although the saw blade 78 is in engagement with the shank of the screw element during twice the time the blade 66 is in engagement with the screw blank, the saw carrying disk 80 has to revolve only one and one-half revolutions during that period of longer engagement and consequently the speed of the saw disk 80 is less than the speed of rotation of the saw disk 64. That slower rotation and the longer engagement increases the life of the saw blade.

It should be noted that the saw blade 78, and also the saw blade 66, rotates in a counter-clockwise direction, as seen in Figures 5 and 9, and since the blade engages the shank of each screw blade when it is positioned to the left of the shaft 20, the blade applies to the shank a downward force so that the very simple guard 69 serves as sufficient protection against the screws jumping out of the recesses of the carrier.

In Figures 12 to 14 is shown a machine or mechanism also for slotting the shanks of screw elements as they are being fed continuously at a uniform rate, but using a circular saw. As shown in these figures, a screw carrier disk or drum 82 is secured to a driving shaft 84 inclined at a small angle. The disk 82 carries a plurality of screw receiving recesses 86 spaced equal distances about, and opening at, the periphery of the disk. Each recess 86 is formed to provide a screw shank receiving slot 88 extending chordally of the disk and inclined (Figure 13) at an angle, preferably 30 degrees, to the plane of the disk, and a slot or ledge 90 extending generally radially and inwardly from the periphery of the disk. Each slot 90 extends tansversely of a recess 88 at one end thereof and forms a shelf 91 for supporting the head of each screw and a guard surface 92 or abutment backing up the head of a screw during the slotting operation.

As the disk 82 revolves continuously at a uniform rate, the screws are fed from a chute 93 by the usual escapement 94 operated by spaced lugs 95 on the surface of the disk. The screws therefore pass from the end of the chute 93 into the recess of the disk and are carried by the disk into engagement with the circular screw slotting saw blade 96. The blade 96 is secured to a driving shaft 98 which is parallel to the shaft 84 and the saw blade rotates in a plane parallel to the plane of rotation of the screw carrier disk and within a circumferential slot 100 in the disk 82.

The screw carrier or disk 82 and the saw 96 are both rotated in a clockwise direction, as seen in Figure 12. Accordingly, the screws are presented to the saw blade free end foremost and the slotting of the shank is begun at the free or entering end of the screw and continued progressively from the entering end toward the head end of the screw. Since the screws are positioned at an angle of thirty degrees to the plane of the screw carrier disk and the saw rotates in a parallel plane, the slot 102 in the shank of the self-tapping screw 104, Figure 15, is formed at an angle of thirty degrees to the body of the screw.

The inclination of the slot 102 with respect to the axis of the screw has been found to cause the self-tapping screw to actually pull itself into the work piece and the self-tapping screw enters even the most brittle material with no fracturing or chipping whatsoever.

In the form of slotting machine shown in Figures 12 to 14, the saw remains in engagement with the screw during the slotting operation for a relatively short time as compared with the spiral saw blade of the slotting machine of Figures 1 to 10. While this is quite satisfactory for cutting slots in screws within a certain range of shank lengths, the slotting machine of Figures 1 to 10 is of more universal application to screws of different lengths. It should be noted that in this modified form of slotting machine, shown in Figures 12 to 14, the slotting saw is so positioned and rotates in such direction as to apply a force lengthwise of the screw toward the head of the screw and inwardly with respect to the carrier disk so that the saw itself acts as a shank hold down and each abutment 92 acts as a head hold down.

It will be obvious that changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. In an article working apparatus, a rotary working tool having a spiral material working edge, article carrying means having a plurality of spaced apart article receiving means for receiving a plurality of articles spaced apart in accordance with the lead of said working tool, and means for continuously moving said carrier at a uniform rate proportional to the rate of rotation of said tool and the pitch of the spiral working edge whereby spaced articles may be correspondingly moved successively into operative engagement and predetermined registration with said material working edge to work said articles.

2. In an article working apparatus, a rotary working tool having a spiral material working edge, article carrier means having a plurality of spaced apart article receiving means spaced apart according to the lead of said spiral material working edge for carrying articles along a path transverse to the geometric axis of the spiral working edge, said article receiving means being adapted to receive an elongated article and support said article with its longitudinal axis extending transversely of said path, means for rotating said tool about the geometric axis of said spiral working edge, and means for continuously moving said carrier at a uniform rate proportional to the rate of rotation of the working tool and to the lead of the spiral working edge to cause the article to move at the same rate as the radial velocity of the spiral working edge of the tool.

3. In a screw slotting machine, a slotter having a spiral screw engaging and working edge, a screw carrier having screw carrying means spaced apart a predetermined distance in accordance with the lead of said spiral working edge, means for rotating said slotter at a predetermined rate, and means for feeding the screw carrier at a continuous uniform rate proportioned to the rate of rotation of said slotter and the lead of said spiral working edge past the slotter on a path generally radial of the geometric axis of the spiral working edge of the slotter.

4. In a screw slotter, screw feeding means movable along a predetermined path of travel, means for continuously driving said feeding means at a uniform continuous rate, said screw feeding means having screw receiving means spaced apart a predetermined distance and adapted to support screws with their longitudinal axes extending transversely of said path of travel, a rotary slotter having a spiral cutting edge with a lead in accordance with the predetermined spacing of said screw receiving means and mounted adjacent said feeding means to engage and slot screws being fed continuously at said rate by said feeding means, and means for driving said rotary slotter in timed relation with the rate of the feeding means and the lead of said slotter.

5. In a screw slotter, a rotary screw carrier having at least one screw carrying means, said screw carrying means being adapted to rotatably support a screw, a rotary slotter having a spiral cutting edge and mounted for rotation about an axis normal to the axis of rotation of said screw carrier, means for rotating said slotter at a uniform rate, and means for rotating said screw carrier at a continuous uniform angular velocity proportional to the pitch of the spiral cutting edge of the slotter and to the rate of rotation of the slotter and with said slotter and said screw carrying means in predetermined phase to cause said slotter to engage and slot a screw.

6. In a screw slotter, a rotary slotter having a spiral cutting edge and mounted for rotation about the geometric axis of the spiral cutting edge, screw carrying means for carrying screws in spaced relation in accordance with the pitch of said cutting edge along a path which adjacent to the slotter is arcuate about an axis transverse to the geometric axis of the spiral, means for rotating said slotter at a uniform rate, and carrier driving means for causing the screws continuously to move along the arcuate path at a uniform angular velocity proportional to the rate of rotation of the slotter and the pitch of the spiral cutting edge of the slotter.

7. In a screw slotter, a rotary wheel having a plurality of outwardly opening angularly spaced peripheral recesses in predetermined spaced relation for receiving screws to be slotted, a screw slotter having a spiral cutting edge having a pitch in accordance with the spaced relation of said recesses and mounted for rotation about the geometric axis of the spiral and normal to the axis of rotation of the wheel, said slotter being positioned to cause the spiral cutting edge to engage screws in the recesses of the rotary wheel, means for rotating said slotter at a uniform rate, and means for continuously rotating said wheel at a uniform angular velocity proportional to the rate of rotation of the slotter and the lead of its spiral cutting edge.

8. In an article working apparatus, a rotary working tool having a spiral material working edge, article carrying means having a plurality of spaced apart article receiving means for receiving a plurality of articles spaced apart in accordance with the lead of said working edge, and means for continuously moving said carrier at a uniform rate proportional to the rate of rotation of said tool and the pitch of the spiral working edge, whereby to move articles along a predetermined path and bring the articles successively into predetermined registration and engagement with the material working edge, said working edge being inclined with respect to said path of travel for increasing the working of the article as the article moves along said path of travel.

9. In a screw slotting machine, a slotter having a spiral working edge, a screw carrier having screw receiving means spaced apart a predetermined distance in accordance with the lead of said spiral working edge, means for feeding said screw carrier at a continuous uniform rate along a predetermined path past the slotter working edge, said slotter being disposed for rotation about an axis extending transversely of said path of travel, and means for rotating said slotter at a predetermined rate proportional to the lead of said spiral and the uniform rate of feeding of the carrier, whereby to form in successive screw shanks a curved slot extending generally longitudinally of the screw shank thereby providing an efficient tapping screw.

10. In a screw slotting machine, a slotter having a spiral screw working edge, a carrier having screw receiving means spaced apart a predetermined distance in accordance with the lead of said spiral working edge, said screw receiving means being adapted to support screws with the shanks of the screws exposed, means for feeding said screw carrier at a continuous uniform rate along a predetermined path past the spiral working edge so that the exposed shanks of the screws are presented so as to be longitudinally slotted by said working edge, said spiral working edge forming a curved slot in the screw shanks to provide efficient tapping screws, and means for rotating said slotter at a predetermined rate proportional to the lead of said spiral working edge and the rate of feeding of said carrier, whereby to present successive screws on the carrier in predetermined registration and engagement with the spiral working edge.

11. A screw slotting machine, comprising a carrier movable along a predetermined path of travel, means on said carrier for supporting a plurality of screws in predetermined spaced relationship with the heads and shanks of the screws exposed, a rotary cutting tool disposed adjacent said path of travel for slotting the shanks of said screws, said cutting tool having a cutting edge curved around its axis of rotation with successive portions of the cutting edge spaced longitudinally of said path of travel, said curved edge having a lead proportional to the predetermined spacing of the screws supported on the carrier, means for continuously moving said carrier at a uniform rate proportional to the rate of rotation of said tool and the lead of said cutting edge, whereby the shanks of the spaced screws may be successively moved into predetermined registration and engagement with said curved working edge, a rotary saw disposed adjacent said carrier and the heads of the screws carried thereby for slotting engagement with the heads of the screws moving along said path of travel, and means including a common drive connection between the saw and cutting tool for continuously rotating both said saw and said cutting tool.

OUGLJESA JULES POUPITCH.

References Cited in the file of this patent

UNITED STATES PATENTS

| Number | Name | Date |
|---|---|---|
| 265,854 | Munger | Oct. 11, 1882 |
| 381,514 | Unbehend | Apr. 17, 1888 |
| 1,280,753 | Juengst | Oct. 8, 1918 |
| 1,408,916 | Wilcox | Mar. 7, 1922 |
| 1,510,729 | Weisner | Oct. 7, 1924 |
| 1,643,474 | Simmons | Sept. 27, 1927 |
| 1,793,648 | Stimpson | Feb. 24, 1931 |
| 1,893,509 | Stimpson | Jan. 10, 1933 |
| 1,921,403 | Bell et al. | Aug. 8, 1933 |
| 2,070,191 | Wildhaber | Feb. 9, 1937 |
| 2,388,183 | Rickenmann | Oct. 30, 1945 |
| 2,540,058 | Stern | Jan. 30, 1951 |
| 2,561,966 | Baumle | July 24, 1951 |